United States Patent
Xie (10) Patent No.: US 9,720,294 B2
(45) Date of Patent: Aug. 1, 2017

(54) LIQUID CRYSTAL PANEL WITH SHORT RESPONSE TIME COMPRISING A LIQUID CRYSTAL HAVING FALLING AND RISING STATES AND DISPLAY DEVICE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/007,539

(22) Filed: Jan. 27, 2016

(65) Prior Publication Data
US 2017/0131596 A1    May 11, 2017

(30) Foreign Application Priority Data
Nov. 5, 2015   (CN) .......................... 2015 1 0746330

(51) Int. Cl.
*G02F 1/1335* (2006.01)
*G02F 1/1343* (2006.01)
*G02F 1/1333* (2006.01)

(52) U.S. Cl.
CPC .. *G02F 1/134309* (2013.01); *G02F 1/133345* (2013.01); *G02F 1/133512* (2013.01); *G02F 1/133514* (2013.01); *G02F 2001/134381* (2013.01)

(58) Field of Classification Search
CPC ......... G02F 1/133345; G02F 1/134309; G02F 2001/134381
See application file for complete search history.

(56) References Cited

U.S. PATENT DOCUMENTS

| | | | | |
|---|---|---|---|---|
| 2003/0156242 A1* | 8/2003 | Kim | ...................... | G02F 1/1393 349/129 |
| 2007/0008480 A1* | 1/2007 | Hong | .................... | G02F 1/1396 349/179 |
| 2012/0133878 A1* | 5/2012 | Hirakata | ........... | G02F 1/133528 349/141 |
| 2012/0249506 A1* | 10/2012 | Jeong | .................. | G02F 1/13306 345/211 |
| 2012/0282838 A1* | 11/2012 | Kim | .................. | G02F 1/133753 445/25 |
| 2014/0028965 A1* | 1/2014 | Kadowaki | ............ | C09K 19/322 349/183 |

* cited by examiner

*Primary Examiner* — Paul Lee
(74) *Attorney, Agent, or Firm* — Andrew C. Cheng (57) ABSTRACT

The present disclosure discloses liquid crystal panel with short response time and display device. The first pixel electrode and the first common electrode of the liquid crystal panel are respectively provided on the two disparate substrates and corresponding to each other. The second pixel electrode and the second common electrode provided on the first substrate and/or the second substrate with an interval, which are projected between the first substrate and the second substrate, and the second pixel electrode and the second common electrode are insulated from the first pixel electrode and the first common electrode. When the liquid crystal is in the rising state, it only applies voltage to the first pixel electrode and the first common electrode. When the liquid crystal is in the falling state, it only applies voltage to the second pixel electrode and the second common electrode.

10 Claims, 5 Drawing Sheets

LIQUID CRYSTAL PANEL WITH SHORT RESPONSE TIME COMPRISING A LIQUID CRYSTAL HAVING FALLING AND RISING STATES AND DISPLAY DEVICE

BACKGROUND OF THE DISCLOSURE

1. Field of the Disclosure

The present disclosure relates to the technology fields of liquid crystal display technology, and in particular to a liquid crystal panel with short response time and a display device.

2. The Related Arts

Liquid crystal is a material state between liquid state and crystalline state. Except it has some properties of both liquid and crystalline (such as mobility, anisotropy, etc.), it also has some unique properties. Research on liquid crystals has become a compelling discipline.

The liquid crystal material is mainly an organic matter including aliphatic, aromatic, stearic acid, and etc. Liquid crystal is also present in biological structure. Soap aqueous solution with appropriate concentration is a kind of liquid crystal. There are thousands kinds of liquid crystal materials synthesized by organic compound. Due to the different environmental conditions of generation, liquid crystal is divided into two categories: liquid crystal phase only existing within a certain temperature range, which is called as thermotropic liquid crystal; liquid crystal phase exhibiting after certain compounds dissolved in water or organic solvent, which is called as lyotropic liquid crystal. Lyotropic liquid crystal is related to biological tissue. Studying the relationship between liquid crystal and living cells is one of the elements of biophysical research now days.

Liquid crystal molecules have discotic and bowl shapes, but mostly are elongated rod. Depending on the molecular arrangement, liquid crystal can be divided into three kinds of smectic phase, nematic phase and cholesteric phase, wherein the nematic phase and cholesteric phase are most widely used.

Due to the rotation of liquid crystal molecules, there will be a time course when each sub-pixel on LCD screen transits from the previous frame color brightness to the next frame brightness color, which is so-called response time. Because the transition processes within different gray levels (ie brightness) of each pixel are with different duration and very complicated, it is difficult to be represented using an objective yardstick. Therefore, in the industrial definition of liquid crystal response time, it tries to utilize the conversion rate of liquid crystal molecules from full black to full white as a the epitome of the response time the entire panel, to represent how fast the liquid crystal display panel. Generally, it can also be called as "On/Off" response time. The conversion speed of the liquid crystal molecules from black to white and from white to black are not entirely consistent. In order to mark out a meaningful response speed of liquid crystal panel, it further defines the response time currently, which is basically throughout response time of "black→white-→black" (bright→dark→light).

Response time is composed of rising time and falling time. The rising time is represented as the time of the panel from the dark state into the bright state, which is mainly determined by the speed of the rotation of the liquid crystal under electric field. The falling time is represented as the time of the panel from the bright into the dark state, which is mainly determined by the speed of the liquid crystal turning back to the initial orientation position under the anchoring force while liquid crystal alignment. Therefore, when the liquid crystal has larger viscosity or under low temperatures, the falling time of the liquid crystal will decrease, which is the main reason of slow response time.

SUMMARY OF THE DISCLOSURE

The present disclosure provides a liquid crystal display panel and a liquid crystal panel with short response time and a display device, which can solve the problem of long response time of the liquid crystal according to prior art.

To solve the above technical issue, one aspect of the present disclosure is to provide a liquid crystal panel with short response time, comprising: a first substrate, a second substrate, a liquid crystal, a first pixel electrode, a first common electrode, a second pixel electrode, and a second common electrode; wherein, the first substrate and the second substrate are parallel to each other, the liquid crystal is encapsulated between the first substrate and the second substrate; wherein, the first pixel electrode and the first common electrode are respectively provided on the two disparate substrates and corresponding to each other; wherein, the second pixel electrode and the second common electrode provided on the first substrate and/or the second substrate with an interval, which are projected between the first substrate and the second substrate, and the second pixel electrode and the second common electrode are insulated from the first pixel electrode and the first common electrode; wherein, when the liquid crystal is in the rising state, it only applies voltage to the first pixel electrode and the first common electrode without applying voltage to the second pixel electrode and the second common electrode, so that an electric field perpendicular to the first substrate is formed between the first pixel electrode and the first common electrode; when the liquid crystal is in the falling state, it only applies voltage to the second pixel electrode and the second common electrode without applying voltage to the first pixel electrode and the first common electrode, so that an electric field parallel to the first substrate is formed between the second pixel electrode and the second common electrode.

Wherein, one of the first substrate and the second substrate is a color filter substrate, and the other is a TFT substrate.

Wherein, the second pixel electrode and the second common electrode are both provided on the color filter substrate and fixed beneath a black matrix of the color filter substrate.

Wherein, the second pixel electrode and the second common electrode are provided on the TFT substrate, on the surfaces of both the first pixel electrode and the first common electrode are provided with an insulating layer, so that the second pixel electrode and the second common electrode are both insulated from the first pixel electrode and the first common electrode.

Wherein, the second pixel electrode and the second common electrode are contacted with the color filter substrate, or the second pixel electrode and the second common electrode are spaced with the color filter substrate.

Wherein, on both the first substrate and the second substrate are provided with the second pixel electrode and the second common electrode, and the second pixel electrode and the second common electrode on the first substrate are corresponding to the second pixel electrode and the second common electrode on the second substrate; on the surfaces of both the first pixel electrode and the first common electrode are provided with an insulating layer, so that the second pixel electrode and the second common electrode are both insulated from the first pixel electrode and the first common electrode.

Wherein, there is a gap between the second pixel electrode on the first substrate and the second pixel electrode on the second substrate; there is a gap between the second common electrode on the first substrate and the second common electrode on the second substrate.

Wherein, both the second pixel electrode and the second common electrode comprise a protrusion and a conductive layer provided on the surface of the projection.

Wherein, the projection is made of a transparent resin material.

To solve the above technical issue, another aspect of the present disclosure is to provide a display device, comprising the liquid crystal panel as mentioned above.

The beneficial effects of the present invention are as follows. Distinguished from the case of the prior art, the present disclosure provides a first pixel electrode and a first common electrode on a first substrate and a second substrate, so that an electric field perpendicular to the first substrate is formed between the first pixel electrode and the first common electrode while applying voltage, so that the liquid crystal is deflected and parallel to the first substrate. The present disclosure further provides a second pixel electrode and second common electrode on the first substrate and the second substrate, and the second pixel electrode and the second common electrode are projected between the first substrate and the second substrate, so that an electric field parallel to the first substrate is formed between the second pixel electrode and the second common electrode while applying voltage, so that the liquid crystal is deflected initial orientation direction under the effects of the electric field parallel to the first substrate without the action of anchoring force, which speeds up the falling time of the liquid crystal. The present disclosure improves the response time of the liquid crystal panel. Even under extreme low temperature, the liquid crystal panel can maintain fast response time without image delay. Moreover, the second pixel electrode and the second common electrode according to the present disclosure are provided with a projection structure, which enhances the intensity of the electric field parallel to the first substrate and shorten the response time of the liquid crystal.

DETAILED DESCRIPTION OF THE PREFERRED EMBODIMENTS

The detailed descriptions accompanying drawings and the embodiment of the present invention are as follows.

Figure 1:
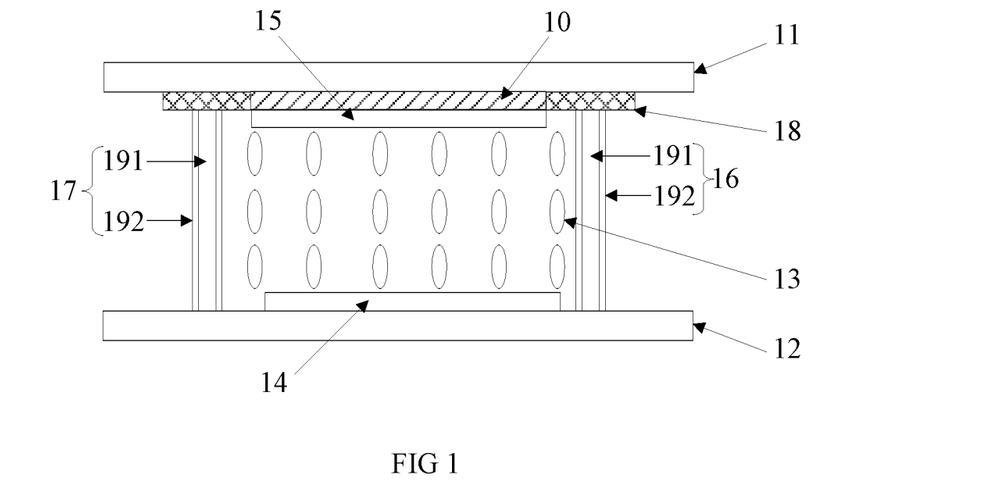
FIG. 1 is a schematic view illustrating the structure of the liquid crystal panel with short response time according tithe first embodiment of the present disclosure without applying voltage.
Figure 2:
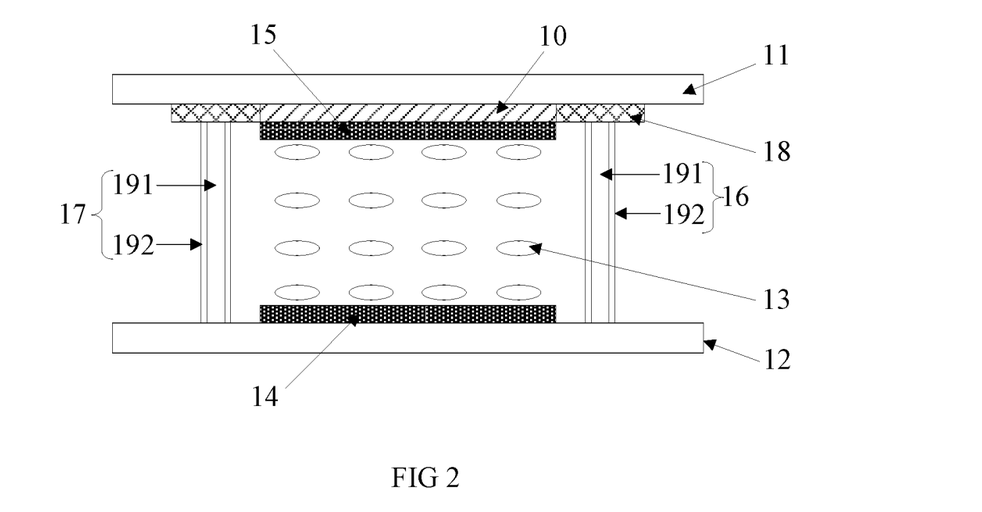
FIG. 2 is a schematic view illustrating the structure of the liquid crystal panel with short response time according to the first embodiment of the present disclosure while applying voltage to the first pixel electrode and the first common electrode.
Figure 3:
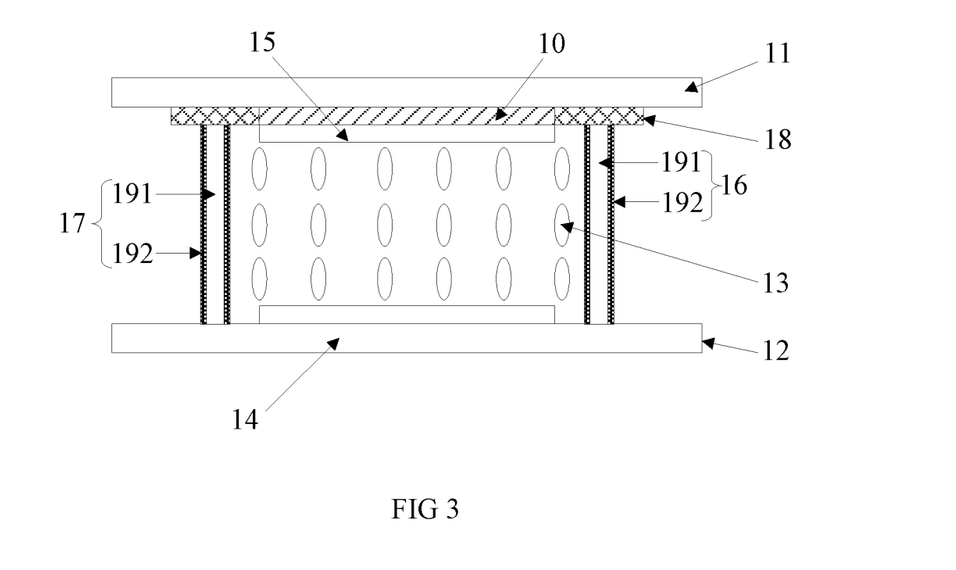
FIG. 3 is a schematic view illustrating the structure of the liquid crystal panel with short response time according to the first embodiment of the present disclosure while applying voltage to the second pixel electrode and the second common electrode.

Referring to FIGS. 1, 2, and 3, FIG. 1 is a schematic view illustrating the structure of the liquid crystal panel with short response time according to the first embodiment of the present disclosure without applying voltage.

FIG. 2 is a schematic view illustrating the structure of the liquid crystal panel with short response time according to the first embodiment of the present disclosure while applying voltage to the first pixel electrode and the first common electrode;

FIG. 3 is a schematic view illustrating the structure of the liquid crystal panel with short response time according to the first embodiment of the present disclosure while applying voltage to the second pixel electrode and the second common electrode.

The present disclosure a liquid crystal panel with short response time. The liquid crystal panel with short response time comprises a first substrate 11, a second substrate 12, a liquid crystal 13, a first pixel electrode 14, a first common electrode 15, a second pixel electrode 16, and a second common electrode 17.

Specifically, the first substrate 11 and the second substrate 12 are parallel to each other, and the liquid crystal 13 is encapsulated between the first substrate 11 and the second substrate 12.

The first pixel electrode 14 and the first common electrode 15 are respectively provided on the two disparate substrates and corresponding to each other. That is, the first pixel electrode 14 is provided on one of the first substrate 11 and the second substrate 12, the first common electrode 15 is provided on the other.

The second pixel electrode 16 and the second common electrode 17 provided on the first substrate 11 and/or the second substrate 12 with an interval, which are projected between the first substrate 11 and the second substrate 12, and the second pixel electrode 16 and the second common electrode 17 are insulated from the first pixel electrode 14 and the first common electrode 15.

As shown in FIG. 2, when the liquid crystal 13 is in the rising state, it only applies voltage to the first pixel electrode 14 and the first common electrode 15 without applying voltage to the second pixel electrode 16 and the second common electrode 17, so that an electric field perpendicular to the first substrate 11 is formed between the first pixel electrode 14 and the first common electrode 15.

At this time, the negative liquid crystal 13 is gradually deflected to horizontal alignment under the action of the vertical electric field.

As shown in FIG. 3, when the liquid crystal 13 is in the falling state, it only applies voltage to the second pixel electrode 16 and the second common electrode 17 without applying voltage to the first pixel electrode 14 and the first common electrode 15, so that an electric field parallel to the first substrate 11 is formed between the second pixel electrode 16 and the second common electrode 17.

At this time, the liquid crystal 13 deflecting to the initial orientation direction is not affected by anchoring force but the electric field in horizontal direction. Therefore, the falling time of the liquid crystal 13 is greatly decreased. The present disclosure improves the response time of the liquid crystal panel, even under extreme low temperature, the liquid crystal panel can maintain fast response time without image delay. Moreover, the second pixel electrode 16 and the second common electrode 17 according to the present disclosure are provided with a projection structure, which enhances the intensity of the electric field parallel to the first substrate 11 and shorten the response time of the liquid crystal 13.

Distinguished from the case of the prior art, the present disclosure provides a first pixel electrode 14 and a first common electrode 15 on a first substrate 11 and a second substrate 12, so that an electric field perpendicular to the first substrate 11 is formed between the first pixel electrode 14 and the first common electrode 15 while applying voltage, so that the liquid crystal 13 is deflected and parallel to the first substrate 11. The present disclosure further provides a second pixel electrode 16 and a second common electrode 17 on the first substrate 11 and/or the second substrate 12, and the second pixel electrode 16 and the second common electrode 17 are projected between the first substrate 11 and the second substrate 12, so that an electric field parallel to the first substrate 11 is formed between the second pixel electrode 16 and the second common electrode 17 while applying voltage, so that the liquid crystal 13 is deflected initial orientation direction under the effects of the electric field parallel to the first substrate 11 without the action of anchoring force, which speeds up the falling time of the liquid crystal 13. The present disclosure improves the response time of the liquid crystal panel, even under extreme low temperature, the liquid crystal panel can maintain fast response time without image delay. Moreover, the second pixel electrode 16 and the second common electrode 17 according to the present disclosure are provided with a projection structure, which enhances the intensity of the electric field parallel to the first substrate 11 and shorten the response time of the liquid crystal 13.

Specifically, one of the first substrate 11 and the second substrate 12 is a color filter substrate, and the other is a TFT substrate. In the present embodiment, the first substrate 11 is color filter substrate, and the second substrate 12 is TFT substrate.

The first pixel electrode 14 is provided on the TFT substrate, and the first common electrode 15 is provided on the color filter substrate. Specifically, the first common electrode 15 is provided on the color resist of the color filter substrate, and the first pixel electrode 14 is corresponding to the first common electrode 15.

The second pixel electrode 16 and the second common electrode 17 are both provided on the color filter substrate and fixed beneath a black matrix 18 of the color filter substrate, so that the second pixel electrode 16 and the second common electrode 17 are spaced with the first pixel electrode 14 and the first common electrode 15. The second pixel electrode 16 and the second common electrode 17 on the color filter substrate are alternately arranged. The second pixel electrode 16 and the second common electrode 17 according to the embodiment can be used as spacers to maintain the thickness of the liquid crystal panel.

The second pixel electrode 16 and the second common electrode 17 both comprise protrusion 191 and an electrode layer 192 on the surface. The projection 191 is made of a transparent resin material, and the shape thereof can be cylindrical or trapezoidal shape. The electrode layer 192 on the surface of the protrusion 191 is formed by sputtering an ITO conductive layer on the protrusion 191. The second pixel electrode 16 and the second common electrode 17 on the color filter substrate are contacted with the TFT substrate, but not contacted with the first pixel electrode 14 and the first common electrode 15. Because the second pixel electrode 16 and the second common electrode 17 according to the present embodiment are only provided on the color filter substrate, the positioning precision of the upper and lower electrode problem is not necessary to be considered.

Referring to FIGS. 4, 5, 6, and 7, FIG. 4 is a schematic view illustrating the structure of the liquid crystal panel with short response time according to the second embodiment of the present disclosure without applying voltage.

Figure 5:
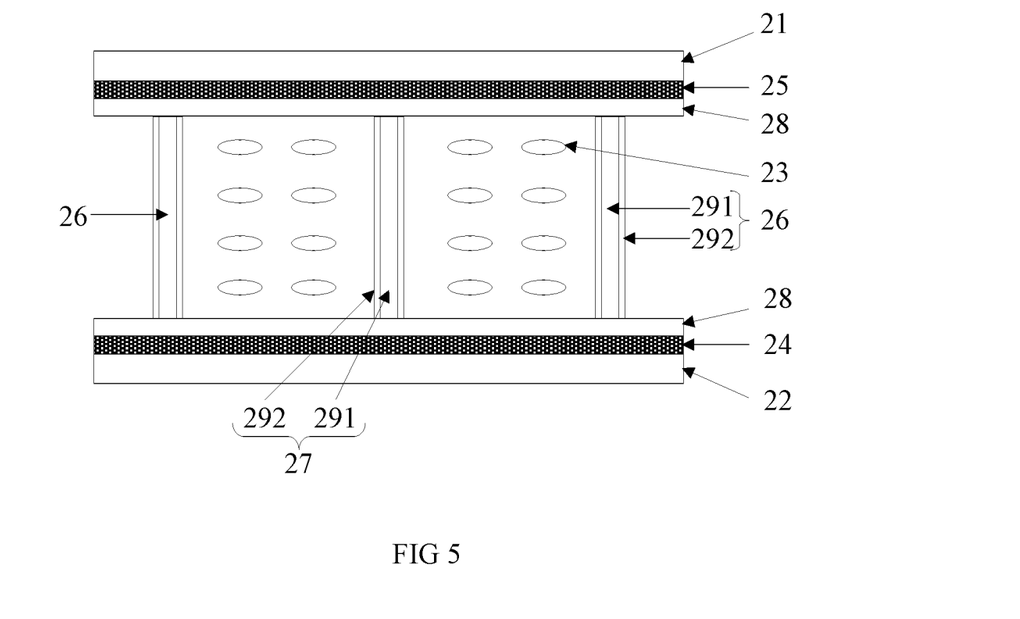
FIG. 5 is a schematic view illustrating the structure of the liquid crystal panel with short response time according to the second embodiment of the present disclosure while applying voltage to the first pixel electrode and the first common electrode.

FIG. 5 is a schematic view illustrating the structure of the liquid crystal panel with short response time according to the second embodiment of the present disclosure while applying voltage to the first pixel electrode and the first common electrode.

Figure 6:
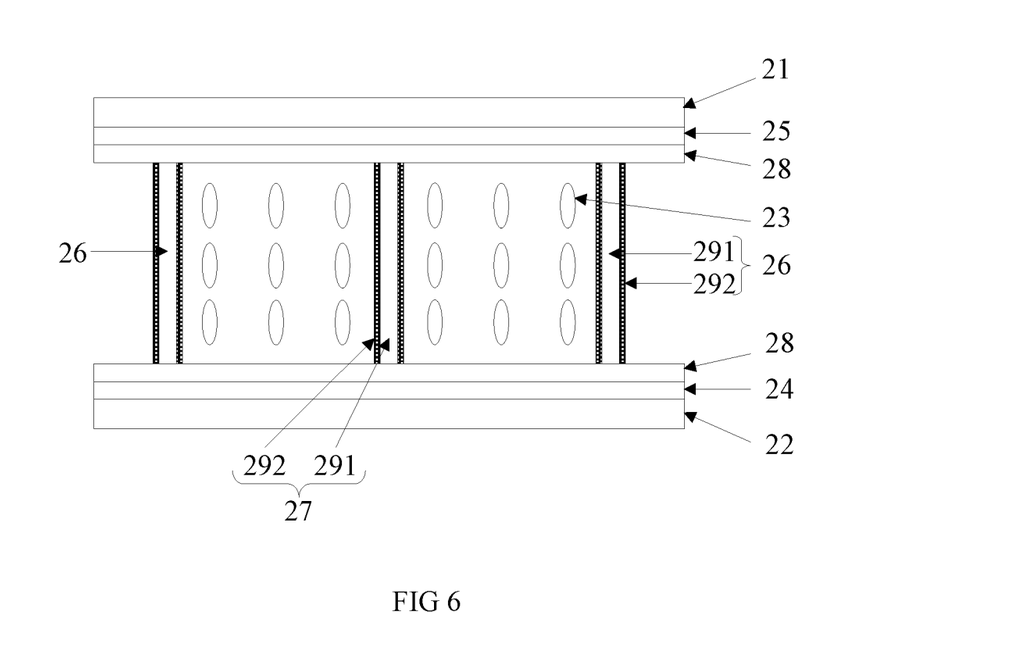
FIG. 6 is a schematic view illustrating the structure of the liquid crystal panel with short response time according to the second embodiment of the present disclosure while applying voltage to the second pixel electrode and the second common electrode, showing the second pixel electrode and the second common electrode contacting with the color filter substrate.

FIG. 6 is a schematic view illustrating the structure of the liquid crystal panel with short response time according to the second embodiment of the present disclosure while applying voltage to the second pixel electrode and the second common electrode, showing the second pixel electrode and the second common electrode contacting with the color filter substrate.

Figure 7:
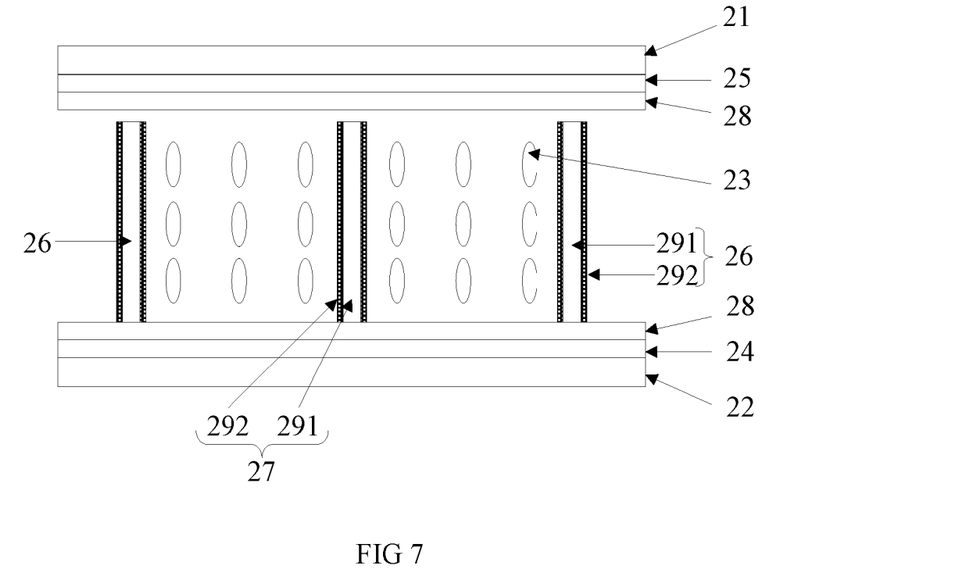
FIG. 7 is a schematic view illustrating the structure of the liquid crystal panel with short response time according to the second embodiment of the present disclosure while applying voltage to the second pixel electrode and the second common electrode, showing the second pixel electrode and the second common electrode being close to but not contacting with the color filter substrate.

FIG. 7 is a schematic view illustrating the structure of the liquid crystal panel with short response time according to the second embodiment of the present disclosure while applying voltage to the second pixel electrode and the second common electrode, showing the second pixel electrode and the second common electrode being close to but not contacting with the color filter substrate.

Figure 4:
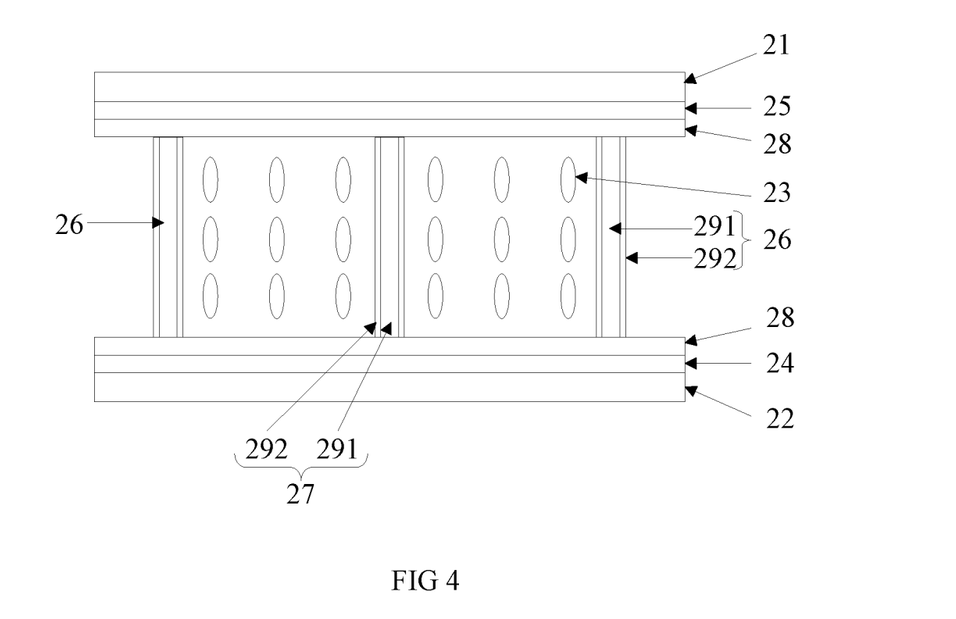
FIG. 4 is a schematic view illustrating the structure of the liquid crystal panel with short response time according to the second embodiment of the present disclosure without applying voltage.

The liquid crystal panel with short response time according to the present disclosure comprises a first substrate 21, a second substrate 22, a liquid crystal 23, a first pixel electrode 24, a first common electrode 25, a second pixel electrode 26, and a second common electrode 27.

Specifically, the first substrate 21 and the second substrate 22 are parallel to each other, and the liquid crystal 23 is encapsulated between the first substrate 21 and the second substrate 22. Wherein, the first substrate 21 is a color filter substrate, the second substrate 22 is a TFT substrate.

The first pixel electrode 24 and the first common electrode 25 are respectively provided on the two disparate substrates and corresponding to each other. For example, the first pixel electrode 24 is provided on the TFT substrate, the first common electrode 25 is provided on the color filter substrate, and the first pixel electrode 24 is corresponding to the first common electrode 25.

The second pixel electrode 26 and the second common electrode 27 are provided on the first substrate 21, that is, on the TFT substrate. The second pixel electrode 26 and the second common electrode 27 are projected between the first substrate 21 and the second substrate 22, and on the surface of the first pixel electrode 24 and the first common electrode 25 are provided with an insulating layer 28, so that the second pixel electrode 26 and the second common electrode 27 are insulated from the first pixel electrode 24 and the first common electrode 25. The second pixel electrode 26 and the second common electrode 27 on the TFT substrate are arranged spaced from each other.

As shown in FIG. 5, when the liquid crystal 23 is in the rising state, it only applies voltage to the first pixel electrode 24 and the first common electrode 25 without applying voltage to the second pixel electrode 26 and the second common electrode 27, so that an electric field perpendicular to the first substrate 21 is formed between the first pixel electrode 24 and the first common electrode 25.

At this time, the negative liquid crystal 13 is gradually deflected to horizontal alignment under the action of the vertical electric field.

As shown in FIG. 6, when the liquid crystal 23 is in the falling state, it only applies voltage to the second pixel electrode 26 and the second common electrode 27 without applying voltage to the first pixel electrode 24 and the first common electrode 25, so that an electric field parallel to the first substrate 21 is formed between the second pixel electrode 26 and the second common electrode 27.

At this time, the liquid crystal 23 deflecting to the initial orientation direction is not affected by anchoring force but the electric field in horizontal direction. Therefore, the falling time of the liquid crystal 23 is greatly decreased. The present disclosure improves the response time of the liquid crystal panel, even under extreme low temperature, the liquid crystal panel can maintain fast response time without image delay. Moreover, the second pixel electrode 26 and the second common electrode 27 according to the present disclosure are provided with a projection structure, which enhances the intensity of the electric field parallel to the first substrate 21 and shorten the response time of the liquid crystal 23.

It is worth to mention that the second pixel electrode 26 and the second common electrode 27 on the TFT substrate are contacted with the color filter substrate, as shown in FIG. 6. Of course, there can be a gap between the second pixel electrode 26 and the second common electrode 27 on the TFT substrate and the color filter substrate. That is, the second pixel electrode 26 and the second common electrode 27 are close to but not contacted with the color filter substrate, as shown in FIG. 7. It benefits the flowability of the liquid crystal and prevents the display screen being abnormal.

The second pixel electrode 26 and the second common electrode 27 both comprise a protrusion 291 and an electrode layer 292 on the surface. The projection 291 is made of a transparent resin material, and the shape thereof can be cylindrical or trapezoidal shape. The electrode layer 292 on the surface of the protrusion 291 according to the present embodiment is formed by sputtering an ITO conductive layer on the protrusion 291.

Because the second pixel electrode 26 and the second common electrode 27 according to the present embodiment are only provided on the TFT substrate, the positioning precision of the upper and lower electrode problem is not necessary to be considered.

Figure 8:
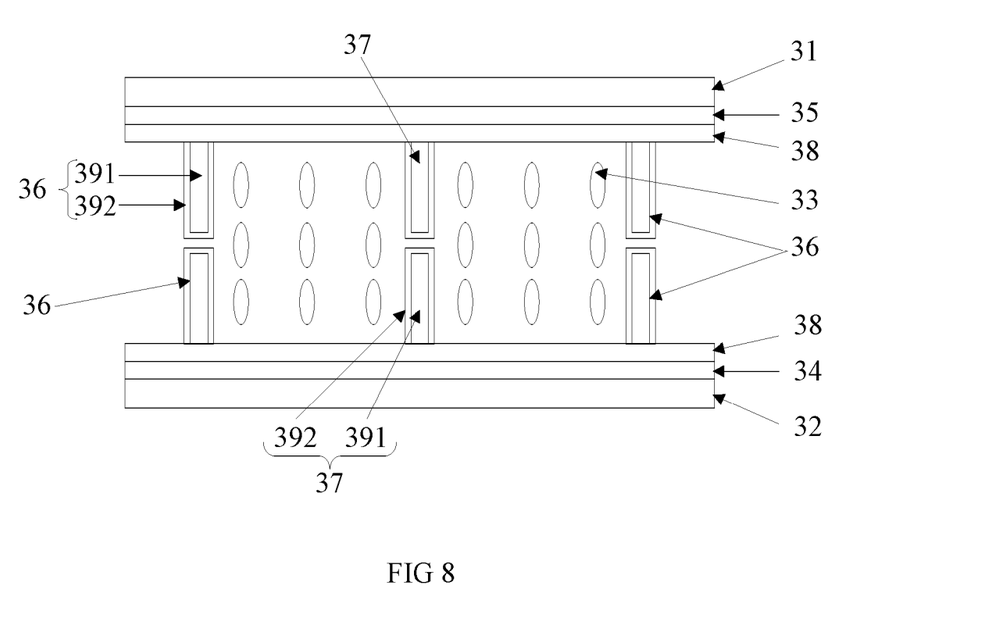
FIG. 8 is a schematic view illustrating the structure of the liquid crystal panel with short response time according to the third embodiment of the present disclosure without applying voltage.
Figure 9:
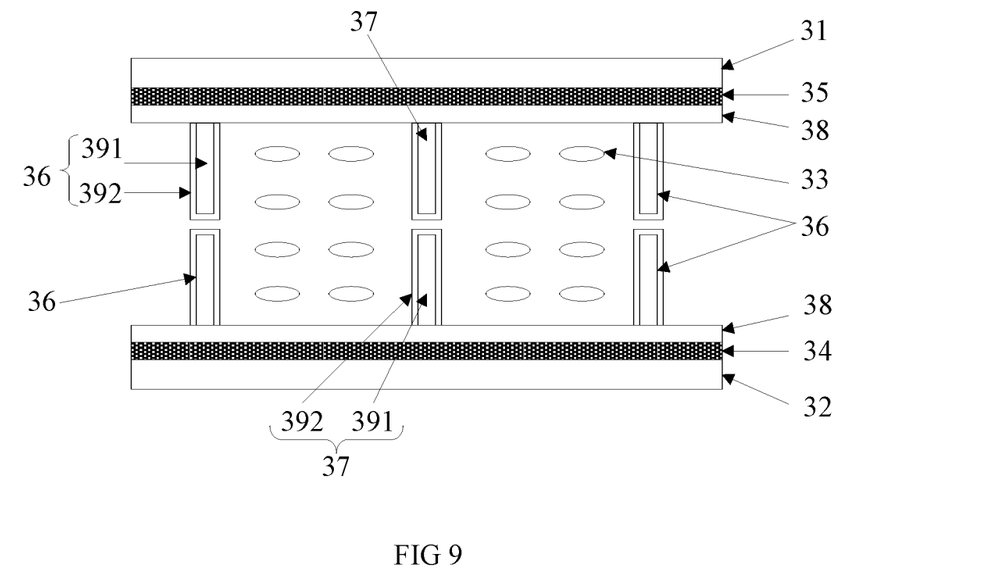
FIG. 9 is a schematic view illustrating the structure of the liquid crystal panel with short response time according to the third embodiment of the present disclosure while applying voltage to the first pixel electrode and the first common electrode.
Figure 10:
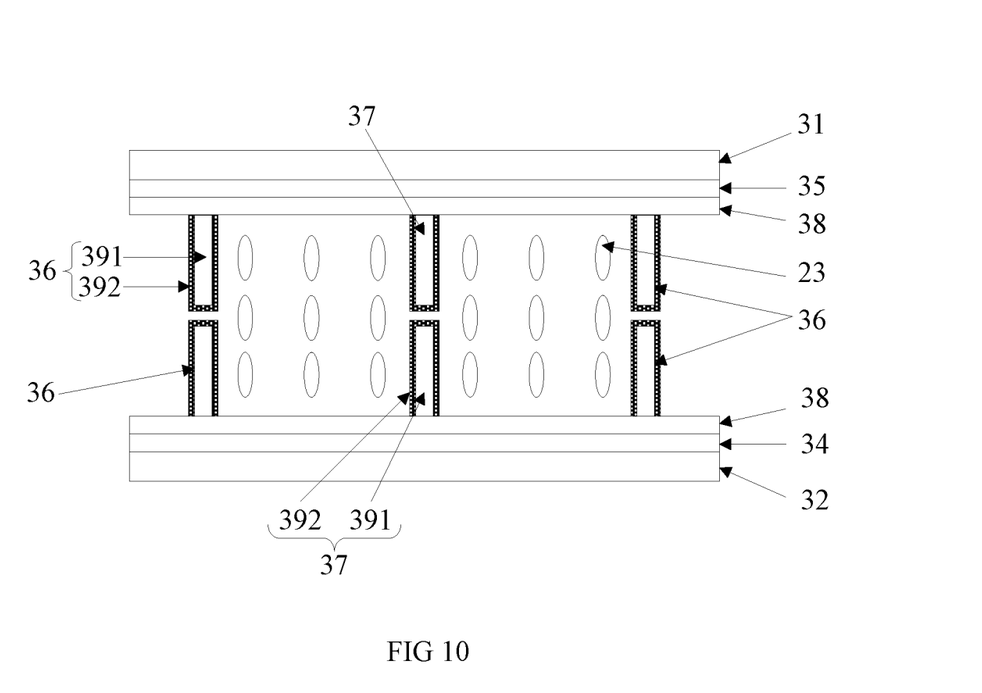
FIG. 10 is a schematic view illustrating the structure of the liquid crystal panel with short response time according to the third embodiment of the present disclosure while applying voltage to the second pixel electrode and the second common electrode.

Referring to 8, 9, and 10, FIG. 8 is a schematic view illustrating the structure of the liquid crystal panel with short response time according to the third embodiment of the present disclosure without applying voltage.

FIG. 9 is a schematic view illustrating the structure of the liquid crystal panel with short response time according to the third embodiment of the present disclosure while applying voltage to the first pixel electrode and the first common electrode.

FIG. 10 is a schematic view illustrating the structure of the liquid crystal panel with short response time according to the third embodiment of the present disclosure while applying voltage to the second pixel electrode and the second common electrode.

The liquid crystal panel with short response time according to the present disclosure comprises a first substrate 31, a second substrate 32, a liquid crystal 33, a first pixel electrode 34, a first common electrode 35, a second pixel electrode 36, and a second common electrode 37.

Specifically, the first substrate 31 and the second substrate 32 are parallel to each other, and the liquid crystal 33 is encapsulated between the first substrate 31 and the second substrate 32. Wherein, the first substrate 31 is a color filter substrate, the second substrate 32 is a TFT substrate.

The first pixel electrode 34 and the first common electrode 35 are respectively provided on the two disparate substrates and corresponding to each other. For example, the first pixel electrode 34 is provided on the TFT substrate, the first common electrode 35 is provided on the color filter substrate, and the first pixel electrode 34 is corresponding to the first common electrode 35.

In the present embodiment, the second pixel electrode 36 and the second common electrode 37 both are provided on the first substrate 31 and the second substrate 32. The second pixel electrode 36 and the second common electrode 37 on the first substrate 31 are spaced from the second pixel electrode 36 and the second common electrode 37 on the second substrate 32.

That is, on the TFT substrate, the second pixel electrode 36 and the second common electrode 37 are spaced from each other; on the color filter substrate, the second pixel electrode 36 and the second common electrode 37 are spaced from each other.

On the surface of the first pixel electrode 34 and the first common electrode 35 are provided with an insulating layer 38, so that the second pixel electrode 36 and the second common electrode 37 are insulated from the first pixel electrode 34 and the first common electrode 35.

As shown in FIG. 9, when the liquid crystal 33 is in the rising state, it only applies voltage to the first pixel electrode 34 and the first common electrode 35 without applying voltage to the second pixel electrode 36 and the second common electrode 37, so that an electric field perpendicular to the first substrate 31 is formed between the first pixel electrode 34 and the first common electrode 35.

At this time, the negative liquid crystal 33 is gradually deflected to horizontal alignment under the action of the vertical electric field.

As shown in FIG. 10, when the liquid crystal 33 is in the falling state, it only applies voltage to the second pixel electrode 36 and the second common electrode 37 without applying voltage to the first pixel electrode 34 and the first common electrode 35, so that an electric field parallel to the first substrate 31 is formed between the second pixel electrode 36 and the second common electrode 37.

At this time, the liquid crystal 33 deflecting to the initial orientation direction is not affected by anchoring force but the electric field in horizontal direction. Therefore, the falling time of the liquid crystal 33 is greatly decreased. The present disclosure improves the response time of the liquid crystal panel, even under extreme low temperature, the liquid crystal panel can maintain fast response time without image delay. Moreover, the second pixel electrode 36 and the second common electrode 37 according to the present disclosure are provided with a projection structure, which enhances the intensity of the electric field parallel to the first substrate 31 and shorten the response time of the liquid crystal 33.

In the present embodiment, there is a gap between the second pixel electrode 36 on the first substrate 31 and the second pixel electrode 36 on the second substrate 32 are contacted with the color filter substrate. There is a gap between the second common electrode 37 on the first substrate 31 and the second common electrode 37 on the second substrate 32. That is, there is a gap between the second pixel electrode 36 and the second common electrode 37 on the color filter substrate and the second pixel electrode 36 and the second common electrode 37 on the TFT substrate, which benefits the flowability of the liquid crystal and prevents the display screen being abnormal.

The second pixel electrode 36 and the second common electrode 37 both comprise a protrusion 391 and an electrode layer 392 on the surface. The projection 391 is made of a transparent resin material, and the shape thereof can be cylindrical or trapezoidal shape. The electrode layer 392 on the surface of the protrusion 391 according to the present embodiment is formed by sputtering an ITO conductive layer on the protrusion 391.

The present disclosure further provides a display device, comprising a frame body 41 and any of the liquid crystal panel 42 as mentioned in above embodiments.

In summary, the present disclosure improves the response time of the liquid crystal panel, even under extreme low temperature, the liquid crystal panel can maintain fast response time without image delay.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the claims of the present disclosure.

What is claimed is:

1. A liquid crystal panel with short response time, comprising:
    a first substrate, a second substrate, a liquid crystal, a first pixel electrode, a first common electrode, a second pixel electrode, and a second common electrode;
    wherein, the first substrate and the second substrate are parallel to each other, the liquid crystal is encapsulated between the first substrate and the second substrate;
    wherein, the first pixel electrode and the first common electrode are respectively provided on the two disparate substrates and corresponding to each other;
    wherein, the second pixel electrode and the second common electrode provided on the first substrate and the second substrate with an interval, which are projected between the first substrate and the second substrate, and the second pixel electrode and the second common electrode are insulated from the first pixel electrode and the first common electrode;
    wherein, when the liquid crystal is in a rising state, it only applies voltage to the first pixel electrode and the first common electrode without applying voltage to the second pixel electrode and the second common electrode, so that an electric field perpendicular to the first substrate is formed between the first pixel electrode and the first common electrode;
    when the liquid crystal is in a falling state, it only applies voltage to the second pixel electrode and the second common electrode without applying voltage to the first pixel electrode and the first common electrode, so that an electric field parallel to the first substrate is formed between the second pixel electrode and the second common electrode.

2. The liquid crystal panel as claimed in claim 1, wherein one of the first substrate and the second substrate is a color filter substrate, and the other is a TFT substrate.

3. The liquid crystal panel as claimed in claim 2, wherein the second pixel electrode and the second common electrode are both provided on the color filter substrate and fixed beneath a black matrix of the color filter substrate.

4. The liquid crystal panel as claimed in claim 2, wherein the second pixel electrode and the second common electrode are provided on the TFT substrate, on the surfaces of both the first pixel electrode and the first common electrode are provided with an insulating layer, so that the second pixel electrode and the second common electrode are both insulated from the first pixel electrode and the first common electrode.

5. The liquid crystal panel as claimed in claim 4, wherein the second pixel electrode and the second common electrode are contacted with the color filter substrate, or the second pixel electrode and the second common electrode are spaced with the color filter substrate.

6. The liquid crystal panel as claimed in claim 1, wherein on both the first substrate and the second substrate are provided with the second pixel electrode and the second common electrode, and the second pixel electrode and the second common electrode on the first substrate are corresponding to the second pixel electrode and the second common electrode on the second substrate; on the surfaces of both the first pixel electrode and the first common electrode are provided with an insulating layer, so that the second pixel electrode and the second common electrode are both insulated from the first pixel electrode and the first common electrode.

7. The liquid crystal panel as claimed in claim 6, wherein there is a gap between the second pixel electrode on the first substrate and the second pixel electrode on the second substrate; there is a gap between the second common electrode on the first substrate and the second common electrode on the second substrate.

8. The liquid crystal panel as claimed in claim 1, wherein both the second pixel electrode and the second common electrode comprise a protrusion and a conductive layer provided on the surface of the projection.

9. The liquid crystal panel as claimed in claim 8, wherein the projection is made of a transparent resin material.

10. A display device, comprising the liquid crystal panel as claimed in claim 1.

* * * * *